United States Patent [19]
Kamenick

[11] 3,707,883
[45] Jan. 2, 1973

[54] POWER TRANSMISSION PULLEY AND MEANS FOR CHANGING THE DIAMETER OF SAME

[75] Inventor: Rudolph J. Kamenick, Terre Haute, Ind.

[73] Assignee: The B. F. Goodrich Company, New York, N.Y.

[22] Filed: Oct. 2, 1971

[21] Appl. No.: 187,328

[52] U.S. Cl..............................74/230.16, 74/230.18
[51] Int. Cl................................................F16h 55/52
[58] Field of Search..74/230.5, 230.7, 230.3, 230.01, 74/230.05, 230.16, 230.18, 243 DR, 242.3, 242.4, 243.1, 243.11, 243.15, 243.19–243.23, 244, 447; 29/159 R, 159.2, 159.3, 450, 453, 305

[56] References Cited

UNITED STATES PATENTS

| | | | |
|---|---|---|---|
| 2,689,483 | 9/1954 | Senna | 74/230.16 |
| 3,605,512 | 9/1971 | Wetzel II | 74/230.18 |
| 425,734 | 4/1890 | Birch | 74/230.5 |

*Primary Examiner*—Milton Kaufman
*Assistant Examiner*—Frank H. McKenzie
*Attorney*—Roger A. Johnston et al.

[57] ABSTRACT

A power transmission pulley having a metal hub and grooved rim for receiving a belt with a plurality of adaptor rings of plastic material for incrementally changing the diameter of the pulley. Each ring has a circumferential rib on the inner periphery and a belt groove on the outer periphery. The adaptors are nested concentrically over the rim of the pulley. Each adaptor ring is axially assembled by circumferential stretching over the rim or previously assembled adaptor ring with the rib received in the belt groove.

13 Claims, 3 Drawing Figures

PATENTED JAN 2 1973　　3,707,883

INVENTOR.
RUDOLPH J. KAMENICK
BY
Roger Johnston
ATTY.

POWER TRANSMISSION PULLEY AND MEANS FOR CHANGING THE DIAMETER OF SAME

BACKGROUND OF THE INVENTION

In the design of equipment requiring power transmission belt drives, it is often required to provide varying ratios of speed between the driver shaft and the driven shafts. This is commonly done by changing one or more of the pulleys to provide the ratio of diameters necessary for the desired speed at which the shaft is to run. This requires that the operation of the driver and driven shafts must be stopped and the belt removed from the sheaves. In many applications, it is quite difficult to remove the belt and change the pulleys or sheaves because of the location of safety guards and surrounding components of the machinery which make the pulleys rather inaccessible. Furthermore, where more than one power transmission belt runs over separate idlers using a common shaft, it may be necessary to remove an adjacent but unrelated transmission belt in order to change the pulleys in the transmission system in which the desired change in speed ratio is to be made.

Another manner in which the speed ratios of a power transmission belt system may be changed is by providing a multiple-groove pulley with grooves of different diameters which are concentric but axially spaced about a common hub. Where such a technique is used, a tension idler is usually employed and the belt is changed by stopping rotation of the pulley shafts and by releasing the belt tension so that the belt may be moved to a different groove on each of the pulleys as desired. Pulleys employed in this manner thus have a generally truncated conical appearance with the largest diameter groove forming the base of the cone and the smallest diameter groove adjacent the apex of the cone. This technique of providing variations in the speed ratios of a power transmission belt system would appear to be quite convenient and a practical solution to a problem. However, where a substantial amount of power is to be transmitted by the belt, with a consequent high tension in the belt, the lateral loads on the pulley shafts may be prohibitive when running the belt on the groove axially farthest from the shaft bearing. The lateral load on the shaft at a distance from the support bearing causes cyclic cantilever deflection of the shaft and presents problems in designing the shaft to resist such deflection and in providing greater bearing capacity for such a shaft. In some applications, such as appliances, it may be uneconomical to increase the size of the shaft and capacity of the bearing for the given application in order to permit the use of a multiple-grooved pulley for varying the speed ratio of the shafts over which the belt runs.

Another alternative which has been used to provide varying speed ratios for shafts driven by a power transmission belt, is that of providing a single pulley having the sides of the sheave axially adjustable so as to vary the width of the groove and thus the radius of the pitch circle in the sheave at which a belt of a given width will run at a given tension. This technique is generally applicable only to power transmission belts having a V-type cross section. An adjustable radius sheave is most commonly used in belt drives for blowers in heating and air conditioning equipment, particularly of the type where a centrifugal vane or "squirrel-cage" type blower is used and driven by a single motor with a speed reduction from the shaft of the motor. This permits adjustment of the sheave on the motor to vary the fan or blower speed. However, the adjustable sheave pulley is often considered prohibitively expensive for heating and air conditioning equipment for residential service applications.

Therefore, it has long been desirable to find an inexpensive means for changing the diameter of a belt driven pulley, particularly in those applications where the pulley is cantilevered on the shaft without requiring removal of the pulley from the shaft.

SUMMARY OF THE INVENTION

The present invention provides a solution to the above-described problem of enabling the diameter of power transmission pulleys, in cantilevered pulley arrangements, to be changed without removal of the pulleys from the shafts. The power transmission pulley of the present invention has a metal hub and rim, with the rim having a groove in the outer periphery for receiving an appropriate power transmission belt therein. A plurality of adaptor rings of elastically deformable material are provided, with each ring having a circumferential rib on the inner periphery and a belt-receiving groove formed in the outer periphery. The rings are nested concentrically in a stretched state over the rim of the pulley to provide incremental changes in the diameter of the pulley. Each ring has a different diameter, with the smallest ring assembled over the metal rim of the pulley by stretching the ring and "snapping" it axially over the rim such that the rib of the ring is received in the pulley groove. The next larger ring is then similarly assembled over the previous ring. In this manner, the diameter of the pulley may be increased by addition of rings or removal of rings of different radial increments to provide various diameters for the pulleys.

DETAILED DESCRIPTION

Figure 1:
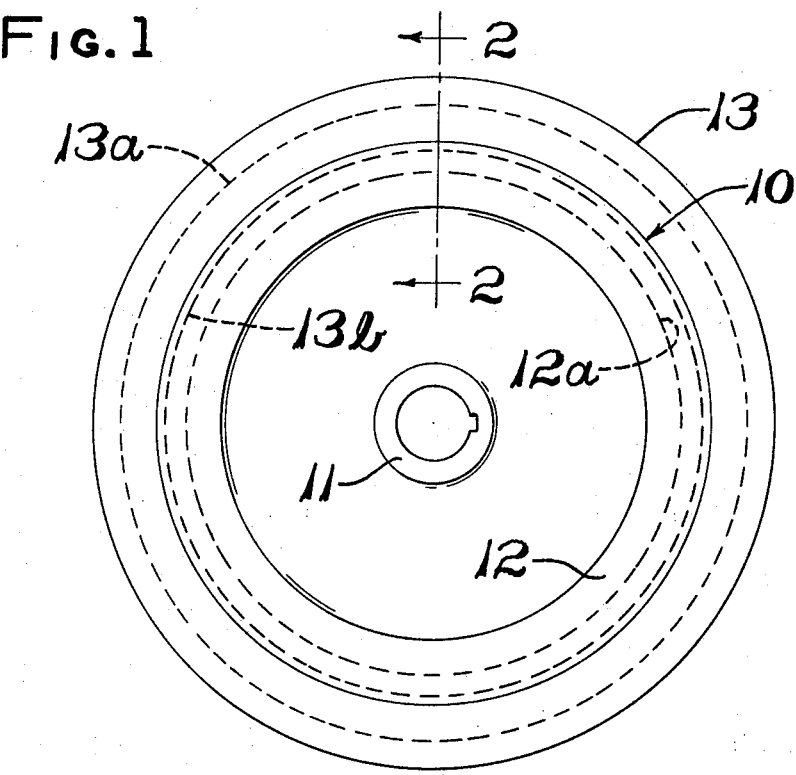
FIG. 1 is a side view of a pulley showing a single adaptor ring installed over the pulley rim.
Figure 2:
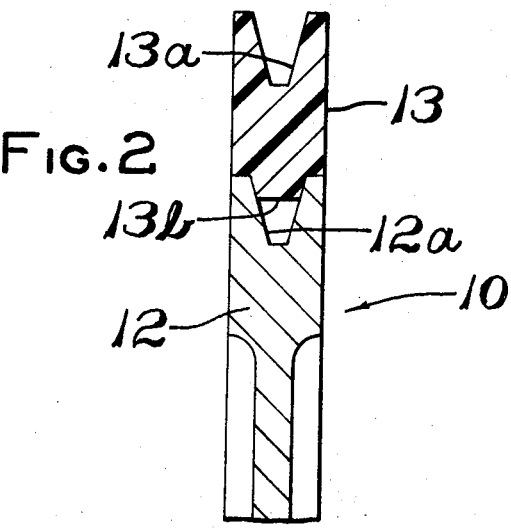
FIG. 2 is a fragmented sectional view taken along section-indicating lines 2—2 of FIG. 1 and shows the configuration of the pulley rim and the adaptor ring.

Referring now to FIG. 1 and 2, the power transmission pulley 10 has a hub 11 of metal with a web extending radially outwardly therefrom, the web having rim 12 with a belt-receiving circumferential groove 12a formed on its outer periphery. The hub 11 of the pulley is illustrated in the drawings as having a key-way formed therein for receiving a key to secure the pulley to a shaft; however, any convenient expedient, as, for example, set screws, or a shear pin, may be used to secure the pulley to the shaft.

An adaptor ring 13, formed of material having a limited elastic extensibility, is received over the rim 12 of the pulley, the ring 13 having a belt-receiving groove 13a formed in the outer periphery thereof and a continuous circumferential rib 13b extending radially inwardly from the inner periphery thereof. In the preferred practice of the invention, the belt-receiving grooves 12a, 13a, for, respectively, the pulley rim and the adaptor ring, are of the type provided for a V-belt drive. The grooves are preferably formed to dimensions established as industry standards, as, for example, those published by the Society of Automotive Engineers or the Rubber Manufacturers Association.

The circumferential rib 13b formed on the inner periphery of the adaptor ring has a configuration corresponding to the groove provided in the rim 12 such that the rim closely interfits the sides of the groove 12a when the adaptor is installed over the rim, so as to prevent axial movement of the adaptor 13 with respect to the rim 12. The radial depth of the rib 13b is shown such that, when the ring is stretched by the desired amount for installation over the rim, the rib will pass over the outer diameter of the rim and will then retract into engagement with the groove 12a. In the preferred practice of the invention, the adaptor rings are formed of synthetic plastic material or elastomeric material having a durometer hardness of at least 80 on the Shore A scale. The adaptor rings, when being installed over the hub, are stretched preferably 3 percent; however, the adaptor rings, in the installed state, may be stretched a minimum of 1 percent for satisfactory operation on the pulley.

Figure 3:
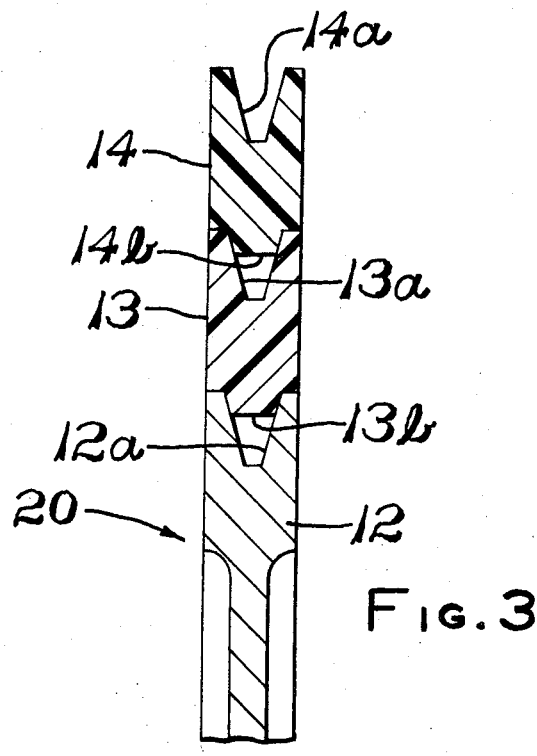
FIG. 3 is a fragmented sectional view of a pulley similar to FIG. 2 and illustrates the presently preferred form of the invention in which a plurality of adaptor rings are installed over the pulley rim.

Referring now to FIG. 3, the invention, as embodied in the preferred form of the pulley 20, is shown with at least two adaptor rings 13 and 14 provided over the rim 12 of the pulley with the rings nested concentrically and centered axially over the rim 12. Each of the adaptor rings has a groove 13a and 14a, respectively, formed in the outer periphery thereof for receiving a power transmission belt therein. A continuous circumferential rib, respectively, 13b and 14b, is provided on the inner periphery of each of the adaptor rings for engagement in a belt-receiving groove. The ring 13 thus has the dimensions of the inner diameter in the free, or unstretched, condition such that when the ring 13 is assembled and received over the rim 12 of the pulley, with the rib 13b received in the groove 12a of the pulley rim, the ring 13 is stretched by the amount described above for the embodiment of FIG. 1. The adaptor ring 14 has its inner diameter and that of its rib 14b such that, in the free or unstretched condition, when the ring 14 is stretched by the above-described amount, and is received over the smaller ring 13, the rib 14b is received in a groove 13a provided in the outer periphery of the smaller ring 13. The pulley 20 thus formed has three available groove diameters for a belt, any one of which may be utilized by adding or removing rings 13 and 14 as desired to have the belt run in the groove 14a, the grooves 13a or the grooves 12a in, respectively, the outer ring, inner ring, or the rim of the pulley.

In the preferred practice of the invention, the ratio of the overall radial depth of the adaptor rings, when installed, is limited to an amount twice that of the width of the adaptor rings. The adaptor rings 13, 14 are preferably formed to a common axial width substantially that of the width of the pulley rim. Furthermore, the overall radial depth of a single adaptor ring is limited to a value twice that of the axial width of the individual ring. However, where a plurality of rings are used over the same pulley, the criterion governing the size of the incremental increase in pulley diameter is that for the overall radial depth of the combined rings, namely, that the overall radial depth does not exceed an amount twice that of the width of the rings. Thus, it will readily be apparent that in such an arrangement, as, for example, the embodiment of FIG. 3, the individual rings will each necessarily have a radial depth to axial width ratio less than 2–1.

Variations of the present preferred embodiment of the invention will be apparent to those having ordinary skill in the art and the invention is limited only by the spirit and scope of the following claims.

I claim:

1. A power transmission pulley comprising:
   a. an integral hub having a circumferential groove formed in the periphery thereof for receiving a belt therein;
   b. annular adaptor means formed of elastically deformable material for increasing the diameter of said pulley a predetermined amount which means is removably received over said hub in a manner requiring circumferential deformation of said means thereof, said means having a circumferential groove formed in the outer periphery thereof for receiving a belt therein and a portion formed integrally therewith and extending from the inner periphery thereof, which portion is received in the groove in the periphery of said hub for retaining said adaptor means on said hub.

2. The pulley defined in claim 1, wherein said portion of said adaptor means extending into the said groove in the hub is a continuous circumferential rib extending radially inwardly.

3. The pulley defined in claim 1, wherein said adaptor means includes at least two annular members with each member having a belt groove in the outer periphery and a portion formed integrally with the inner periphery thereof extending radially inwardly therefrom and the annular members are of diameters such as to nest radially and concentrically, with the inner one of said members received directly over said hub.

4. The pulley defined in claim 3, wherein each of said annular members has the said portion formed integrally with the inner periphery thereof in the form of a continuous circumferential rib extending radially inwardly and received in the next inner belt groove.

5. The pulley defined in claim 3, wherein each of the said annular members has its inner diameter in the unstretched state less than its assembled and stretched inner diameter such that each annular member in the assembled state is stretched by an amount equal to at least 1 percent of its free diameter.

6. The pulley defined in claim 1, wherein the groove in said hub periphery and said groove in said adaptor means are substantially V-shaped.

7. The pulley defined in claim 1, wherein said adaptor means has a radial thickness not greater than twice its axial width.

8. Means for incrementally changing the diameter of a grooved power transmission pulley comprising an annulus of elastically deformable material having a circumferential groove formed in the outer periphery thereof for receiving a belt therein and having a portion formed integrally therewith and extending from the inner periphery thereof, wherein said means is adapted to be installed in a stretched condition over a rigid grooved pulley with the said portion extending from the inner periphery received in the pulley groove.

9. The means defined in claim 8, wherein said portion extending from the inner periphery is a continuous circumferential rib extending radially inwardly such that circumferential deformation of said means is required to assemble same over the web of a grooved pulley.

10. The means defined in claim 8, wherein said means comprises at least two annular members with each member having a belt groove in the outer periphery and a portion formed integrally with the inner periphery extending radially inwardly therefrom, the said annular members being of different diameters such as to nest concentrically in respectively increasing radial increments, with the inner member adapted to be installed in a stretched state over a grooved pulley and each successively larger member adapted to be installed in a stretched condition over the next smaller member.

11. The means defined in claim 10, wherein each of said annular members has the said portion formed on the inner periphery in the form of a continuous circumferential rib extending radially inwardly such that circumferential deformation of each member is required to install and remove each of said members from a mating groove.

12. The means defined in claim 10, wherein the inner one of said members has its free inner diameter less than the diameter of the rim, a pulley over which said member is to be assembled such that when said inner member is assembled over a grooved pulley, it is stretched by an amount equal to at least 1 percent of its free diameter and each of the remaining members has its free inner diameter less than the diameter of the outer periphery of the assembled next inner member over which it is to be assembled such that when assembled, it is stretched by an amount equal to at least 1 percent of its free inner diameter.

13. The means defined in claim 8, wherein said means has a radial thickness not greater than twice its axial width.

* * * * *